Dec. 28, 1926.

C. L. FITZ 1,612,275

FILM FEEDING MECHANISM

Original Filed Nov. 3, 1922    3 Sheets-Sheet 1

Dec. 28, 1926.

C. L. FITZ 1,612,275

FILM FEEDING MECHANISM

Original Filed Nov. 3, 1922   3 Sheets-Sheet 2

Witness
John Enders

Inventor
CHARLES L. FITZ,
by Robert Burns
Atty.

Dec. 28, 1926.

C. L. FITZ 1,612,275

FILM FEEDING MECHANISM

Original Filed Nov. 3, 1922    3 Sheets-Sheet 3

Witness:
John Enders

Inventor
CHARLES L. FITZ,
by Robert H. Burns
Atty.

Patented Dec. 28, 1926.

1,612,275

UNITED STATES PATENT OFFICE.

CHARLES LEO FITZ, OF FOND DU LAC, WISCONSIN, ASSIGNOR TO DROP HEAD PROJECTOR COMPANY, OF FOND DU LAC, WISCONSIN, A CORPORATION OF WISCONSIN.

FILM-FEEDING MECHANISM.

Application filed November 3, 1922, Serial No. 598,866. Renewed May 29, 1926.

This invention relates to that class of intermittent film feeding mechanisms for portable motion picture machines, in which the Geneva type of gearing is used and in which a pair of transversely spaced film magazines are employed to furnish an upwardly extending loop of the picture film for movement through the film feeding mechanism and exposure in the light passage of the machine, and this improvement has for its objects:—

To provide a structural formation and association of parts in the frame or support of the intermittent feed mechanism and the film supply and take-up sprocket drums, by means of which the torsional stress is distributed to separate bearings on the frame or support to aid in a material degree in reducing the usual tendency of the parts to vibration in practical use, and which in addition provides an oil immersion for the intermittent gear wheels to prevent the usual noise and wear of same in actual use.

To provide a formation and combination of parts in the operative connections between a driving motor and the carrying shafts of the light shutter, intermittent film feeding mechanisms, the film supply means and the film take-up means, whereby said means and mechanisms are operated in unison in a ready and effective manner.

To provide in connection with the aligned and transversely spaced film supply and take-up sprocket drums and the chain and sprocket wheel connection between the shaft of said drums and the take-up reel of the machine, whereby a slip of the driving sprocket wheel is attained in an effective manner to compensate for the progressive increase in the peripheral travel of the film in its continued winding upon the film take-up reel.

To provide a structural formation and association of the film feeding and reeling mechanisms adapting the same for change from motor to manual actuation or vice versa, at the will of the operator and in a ready and convenient manner, and with which the inactive driving means will not offer any impedance to the operation of the other driving means used in driving the machine, all as will hereinafter more fully appear.

In the accompanying drawings:—

Like reference numerals indicate like parts in the several views.

Figure 1:
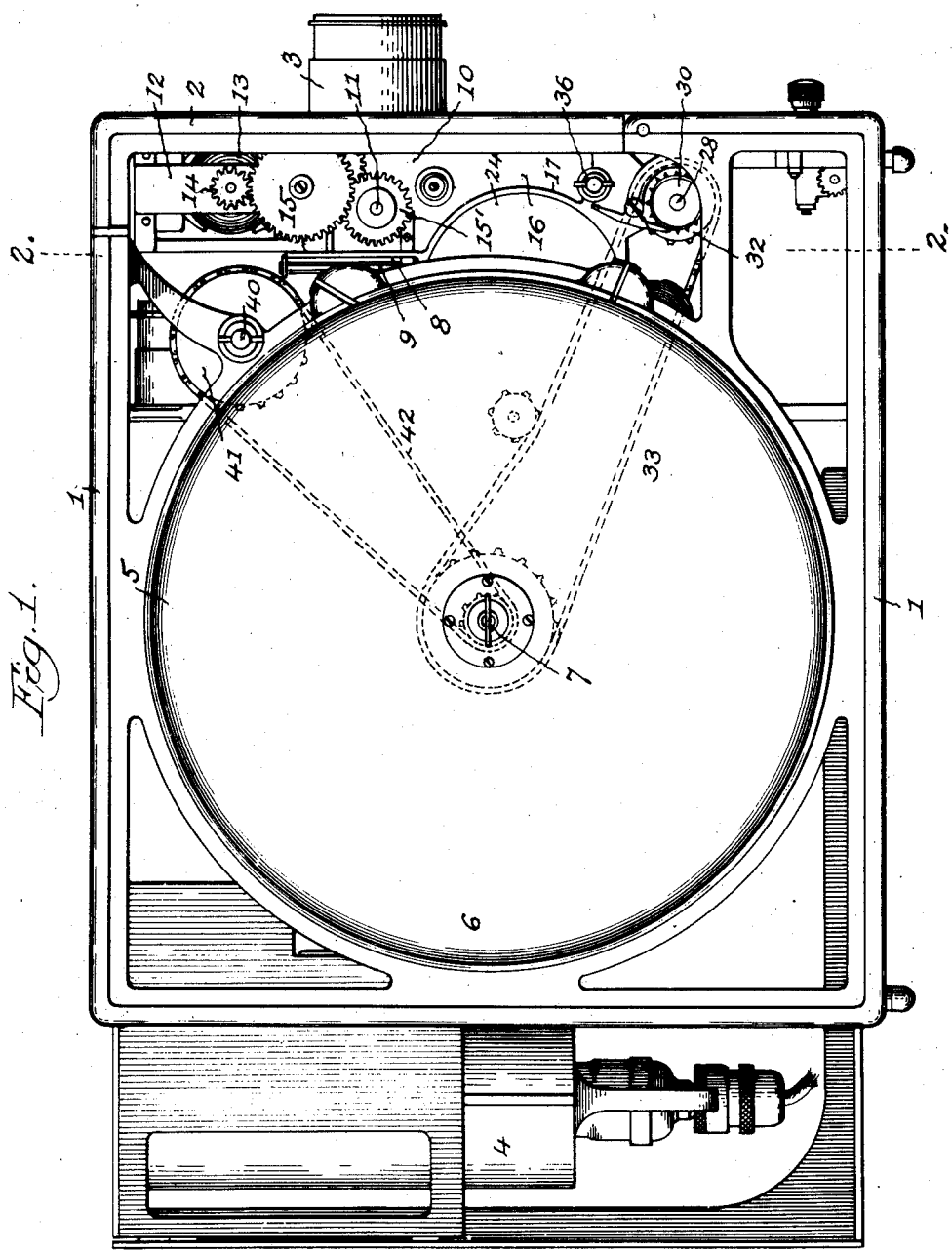
Fig. 1, is a side elevation of a motion picture machine embodying this invention, a forward panel of the enclosing casing being removed to show the enclosed mechanisms.

Referring to the drawings, 1 designates the main enclosing shell or casing of the usual rectangular form, in the interior of which are mounted the film feeding and film reeling mechanisms of a motion picture machine. The casing 1 is preferably of the type described in the McMillan Letters Patent Nos. 1,326,407 and 1,326,410, dated December 30, 1919, in which the upper and forward portion 2 is hinged at its lower end to the main portion of the casing to constitute a drop head upon which is mounted the hereinafter described intermittent film feeding mechanism. In connection with such mechanism the drop head portion 2 carries the projecting objective 3 of the machine, while the rear end of the main portion of the casing is adapted to receive the longitudinally adjustable lamp house 4 of the machine.

5 designates one of the reel housings of the machine fixedly supported within the casing 1 by an individual carrying frame 6, with the reel in said reel housing 5 adapted for detachable engagement with an operating shaft 7 common to the pair of film reels of the machine, as set forth in Patents Nos. 1,326,407 and 1,326,410 aforesaid.

As in the aforesaid patents, the frame or housing for the light controlling shutter for the aperture plate 8 and associated film confining gate 9, as well as the interconnected intermittent film feeding means, film supply means and film take-up means, is secured to the inner vertical surface of the drop-head portion 2 of the main casing, to move therewith in the different use of the machine. In this improvement said frame or housing and the parts and means just referred to, have a detail structural formation and arrangement as follows:

10 designates a box like portion intermediate the height of said frame, adapted to support and guide the aforesaid vertically adjustable aperture plate 8 and film confining gate 9 and to enclose the light controlling shutter, which is preferably of the bladed barrel type, the carrying shaft 11 of which extends out through said box portion 10, to receive a gear wheel which forms a part of the hereinafter described gearing of the machine. The carrying shaft 11, is preferably arranged in frictional engagement with said gear wheel so as to be capable of independent adjustment by a hand wheel 11', when an adjustment of the shutter is required.

12 designates a frame work extending upwardly from the aforesaid box portion 10, to provide a support for the driving electric motor 13 of the machine. Said motor is arranged transversely of the main casing 1 and carries a gear wheel 14 on the end of its armature shaft for operative engagement with series of idler gear wheels 15 arranged on the side of the frame or housing and adapted to transmit motion from the gear wheel 14 of the armature shaft to a gear wheel 15' on the shutter carrying shaft 11, and in this improvement the gear wheel 15' is connected to the shaft 11, by a ratchet or like clutch 11'' so as to permit a rotation of the shutter shaft independent of the gear wheel 15' when the machine is manually driven as hereinafter described.

Figure 4:
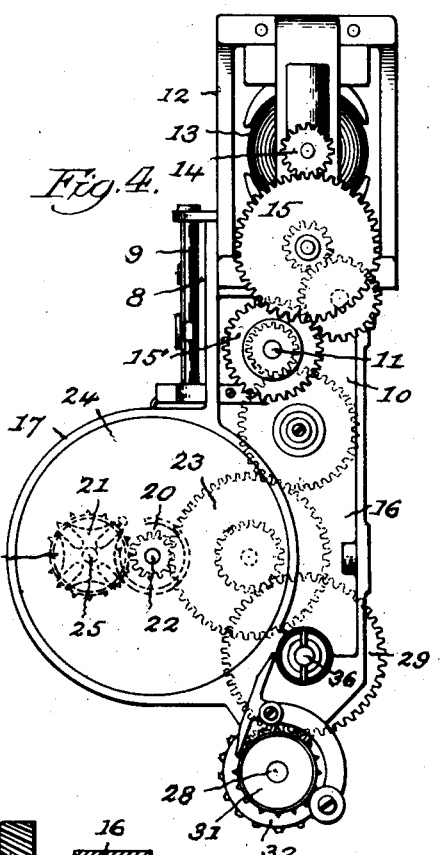
Fig. 4, is a similar view of the same from the opposite side to that shown in Fig. 3.
Figure 5:
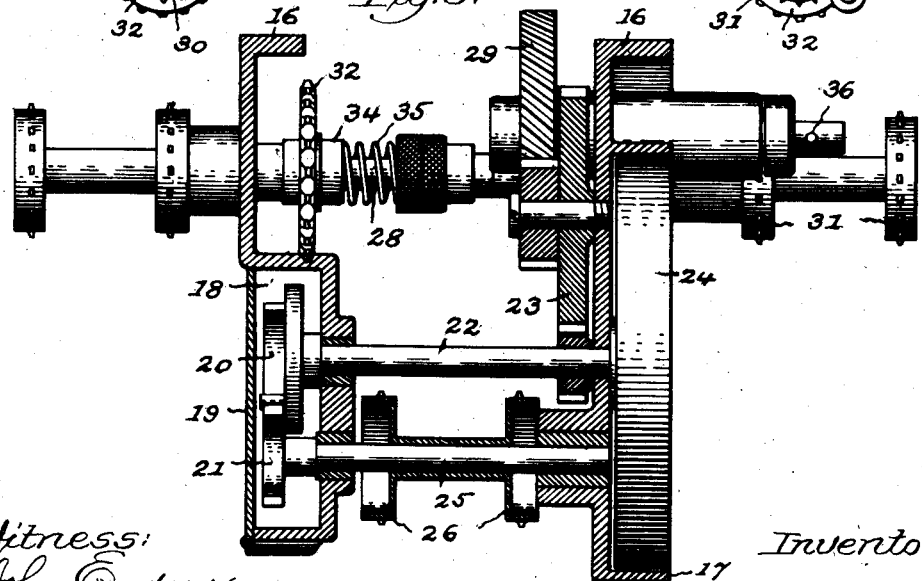
Fig. 5, is an enlarged detail horizontal section on line 5—5, Fig. 3.

16 designates side webs depending from the box portion 10 of the frame to provide bearings for the carrying shaft of intermittent film feeding means, as well as housing for the fly wheel of the driving shaft of such means. To such end one of the webs 16 is formed with a circular flange 17 forming a containing recess for said fly wheel, as shown in Figs. 4 and 5, while the other of said webs 16 is formed with a recess 18 having a removable closure head 19 and adapted to enclose the pair of intermittent gear wheels 20 and 21 of said film feeding means, and which in the construction shown are of the ordinary Geneva type. The described arrangement of the gear wheels in a closed recess enables the gear wheels to run in a filling of oil with a view to perfect lubrication and an elimination of noise in their operation.

Figure 2:
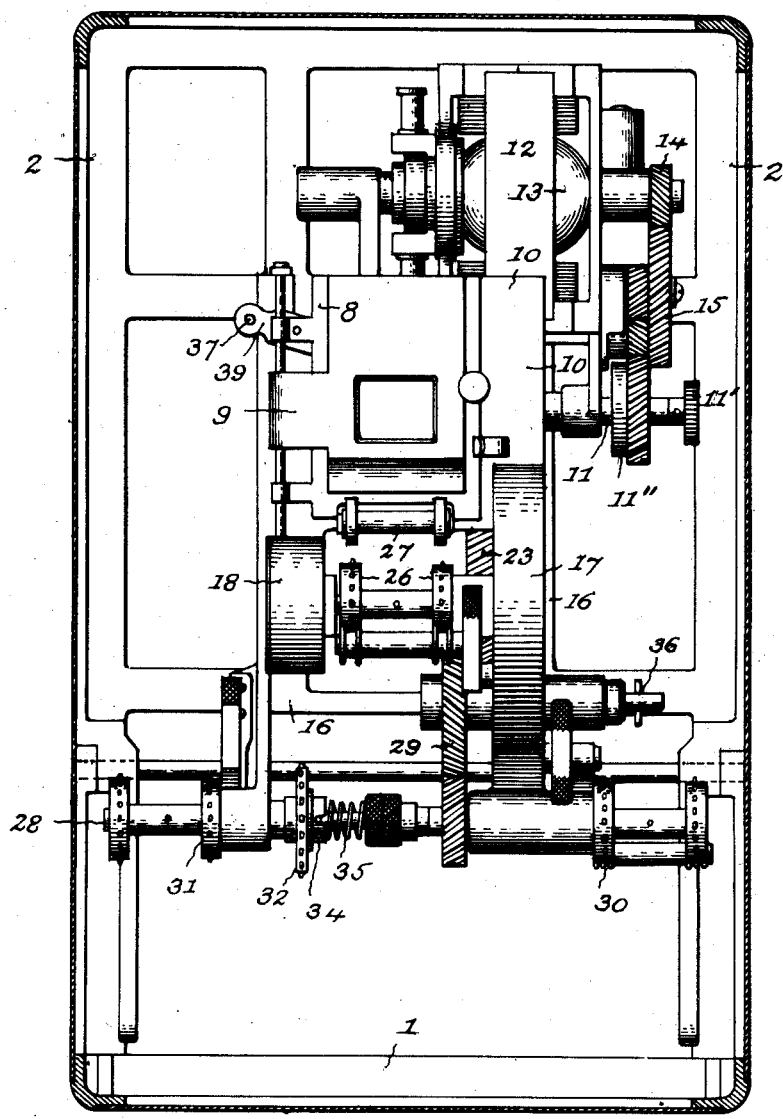
Fig. 2, is an enlarged transverse sectional elevation on line 2—2, Fig. 1.
Figure 3:
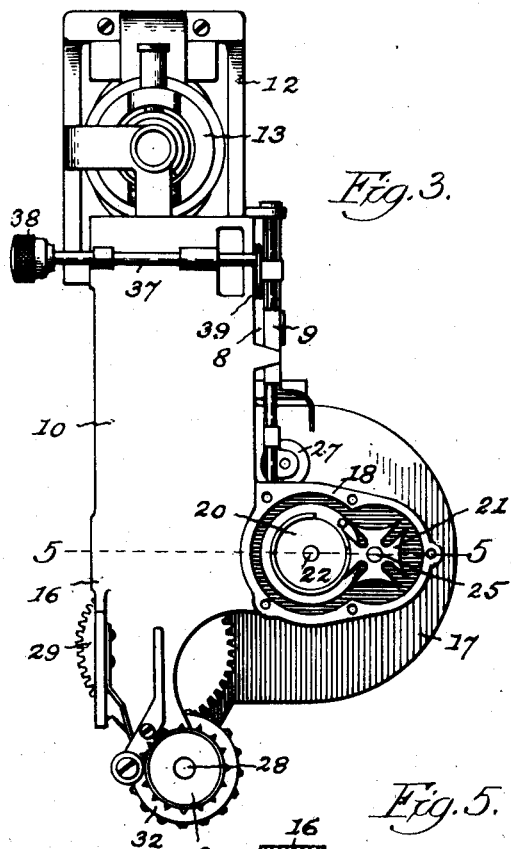
Fig. 3 is an enlarged side elevation of the film feeding mechanism and accessories, the cover of the containing chamber of the intermittent gearing being removed.

22 designates the driving shaft of the intermittent gearing above described, journalled near its respective ends in the webs 16 and operatively connected to the shutter carrying shaft 11 by a series of intermediate gear wheels 23. The shaft 22 carries at one end the fly wheel 24 above referred to, and at the other end the driving gear wheel 20 of said intermittent gearing as illustrated in Figs. 2, 4 and 5.

25 designates the driven shaft of said gearing, journalled in the webs 16 in parallel relation to the shaft 22 aforesaid, and carrying near one end the driven gear wheel 21 of said gearing.

26 designates a film feeding sprocket drum mounted on the central portion of the shaft 25 between the webs 16 and adapted to draw in an intermittent manner, the picture film or web down past the aperture of the aperture plate 8 in an exhibiting operation of the machine.

27 designates a guide roller mounted on the lower end of the film confining gate 9 and adapted to act as an idler roller in guiding the passing picture film to the intermittently rotating sprocket drum 26 as above described.

28 designates a transversely arranged shaft journalled in the aforesaid webs 16 and operatively connected by a series of gear wheels 29 with the shutter shaft 11 and with the driving shaft 22 of the intermittent gearing to rotate in unison therewith. The ends of the shaft 28 extend beyond the webs 16 as shown, with one end adapted to carry the film supply sprocket drum 30 by which the supply of film from the film supply reel housing or magazine is drawn in the usual continuous manner to afford an unimpeded supply of film to the intermittent film feeding mechanism of the machine, while the other end of the shaft 28 is adapted to carry the film take-up sprocket drum 31 by which the film is drawn from said intermittent mechanism and fed to the take-up reel of the take-up reel housing or magazine.

32 designates a sprocket wheel mounted on the shaft 28 and connected by an endless chain 33 with a sprocket wheel on the heretofore described shaft 7 of the reel housings and reels of the machine to operate the reels as described in detail in my companion application for patent Serial No. 598,865. In this improvement the connection between the sprocket wheel 32 and the shaft 28 is of a loose form adapted to permit independent rotation of said shaft, with the parts operatively connected together by a friction coupling as follows:—

34 designates a friction head slidingly mounted on the shaft 28 and adapted to have frictional bearing against the adjacent side of the sprocket wheel 32.

35 designates an adjustable spring encircling the shaft 28 and adapted to provide the required frictional engagement between the head 34 and the sprocket wheel 32.

36 designates a non-circular extension on the carrying shaft of one of the series of gear wheels 29 aforesaid, adapted to receive a hand crank for a manual operation of the machine, when such manual operation instead of motor operation is desired.

37 designates a revoluble shaft journalled on one side of the box portion 10 of the carrying frame or housing before described, extending longitudinally through the front wall of the main casing 1 and provided at its outer end with a wheel or handle 38 for convenient rotary adjustment of the shaft.

39 designates a forked rock arm secured to the rear end of the shaft 37, with its forked end in engagement with a fixed pin or stud on the aperture plate 8 aforesaid. The described construction is adapted to effect an upward and downward adjustment of the aperture plate in accordance with the direction in which the handle 38 is turned, in the operation of framing the picture of the film in the light opening of said aperture plate in a convenient and accurate manner.

40 designates a shaft journalled transversely in the upper and forward portion of the main casing 1 and having an externally arranged operating handle for manual rotation. The shaft 40 carries a sprocket wheel 41 connected by an endless chain 42 with a sprocket wheel on the reel carrying shaft 7 aforesaid, for use in rewinding the picture film after an exhibition of the same, as set forth in detail in my aforesaid application, Serial No. 598,865.

Having thus fully described my invention, what I claim as new and desire to seek by Letters Patent is:—

1. In a motion picture machine having a drop front hinged at its lower end to the enclosing casing of the machine, the combination of a housing attached to said drop front and comprising a shell portion and depending side webs, an aperture plate and a film confining gate associated with said shell portion of the housing, driving gear connections at one side of said housing, a pair of intermittent gear wheels having carrying shafts journalled in said side webs with the driving shaft thereof in operative engagement with said driving gear connections, a film feeding drum on the shaft of the driven gear wheel and disposed in the space between said webs, a transverse shaft journalled in the lower portion of said webs in adjacent relation to the hinge of the drop front, gearing connections between the transverse shaft and the driving shaft of the intermittent gear wheels, film supply and film take-up drums mounted on the ends of said transverse shaft, and a sprocket wheel frictionally mounted on said transverse shaft and adapted for operative connection with the carrying shaft of the film take-up reel of the machine.

2. In a motion picture machine having a drop front hinged at its lower end to the enclosing casing of the machine, the combination of a housing attached to said drop front and comprising an upper motor supporting frame, an intermediate shell portion and depending side webs, a motor mounted in said upper supporting frame and having one end of its armature shaft extending beyond one side of said housing, an aperture plate and a film confining gate associated with said shell portion of the housing, gear connections at one side of the housing connected to the armature shaft aforesaid, a pair of intermittent gear wheels having carrying shafts journalled in said side webs with the driving shaft thereof in operative engagement with the aforesaid gear connections, a film feeding drum on the driven shaft of said pair of gear wheels and disposed in the space between said side webs, a transverse shaft journalled in the lower portion of said webs in adjacent relation to the hinge of the drop front, gearing connections between the transverse shaft and the driving shaft of the intermittent gear wheels, film supply and film take-up drums mounted on the ends of said transverse shaft, and a sprocket wheel frictionally mounted on said transverse shaft and adapted for operative connection with the carrying shaft of the film take-up reel of the machine.

3. In a motion picture machine having a drop front hinged at its lower end to the enclosing casing of the machine, the combination of a housing attached to said drop front and comprising a shell portion and depending side webs, one of said side webs having a closed receiving cavity, an aperture plate and film confining gate associated with said shell portion of the housing, driving gear connections at one side of said housing, a pair of intermittent gear wheels arranged in the aforesaid closed recess of a side web and having carrying shafts journalled in said side webs with the driving shaft thereof in operative engagement with said driving gear connection, a film feeding drum on the shaft of the driven gear wheel and disposed in the space between said webs, a transverse shaft journalled in the lower portion of said webs in adjacent relation to the hinge of the drop front, gearing connections between the transverse shaft and the driving shaft of the intermittent gear wheels, film supply and film take-up drums mounted on the ends of said transverse shaft, and a sprocket wheel mounted on said transverse shaft and adapted for operative connection with the carrying shaft of the film take-up reel of the machine.

4. In a motion picture machine having a drop front hinged at its lower end to the enclosing casing of the machine, the combination of a housing attached to said drop frame and comprising an upper motor supporting frame, an intermediate shell portion and depending side webs, one of said side webs having a closed receiving cavity, a motor mounted in said upper supporting frame and having one end of its armature shaft extending beyond one side of the housing, an aperture plate and a film confining gate associated with said shell portion of the housing, gear connections at the side of the housing connected to the armature shaft aforesaid, a pair of intermittent gear wheels arranged in the aforesaid closed recess of a side web and having carrying shafts journalled in said side webs with the driving shaft thereof in operative engagement with the aforesaid gear connection, a film feeding drum on the shaft of the driven shaft of said pair of gear wheels and disposed in the space between said side webs, a transverse shaft journalled in the lower portion of said webs in adjacent relation to the hinge of the drop front, gearing connections between the transverse shaft and the driving shaft of the intermittent gear wheels, film supply and film take-up drums mounted on the end of said transverse shaft, and a sprocket wheel mounted on said transverse shaft and adapted for operative connection with the carrying shaft of the film take-up reel of the machine.

5. In a motion picture machine, the combination of an enclosing casing, a housing attached to a vertical wall of said casing and comprising an upper motor supporting frame, an intermediate shell portion and depending side webs, an aperture plate and film confining gate associated with said shell portion of the housing, a motor mounted in the upper frame of the housing with its armature shaft extending beyond a side of the housing, gear connections at a side of the housing connected to the armature shaft aforesaid, one of the gears of said connection having ratchet connection with its driving shaft, a pair of intermittent gear wheels having carrying shafts journalled in said side webs with the driving shaft thereof in operative engagement with the aforesaid gear connections, a film feeding drum on the driven shaft of the intermittent gear wheels, a transverse shaft journalled in the lower portion of said webs, gearing connections between the transverse shaft and the driving shaft of the intermittent gear wheels, one of the gears of said connection having a carrying shaft formed for manual actuation, film supply and film take-up drums mounted on the ends of said transverse shaft, and a sprocket wheel on the transverse shaft adapted for operative connection with the carrying shaft of the film take-up reel of the machine.

6. In a motion picture machine having a drop front hinged at its lower end to the enclosing casing of the machine, the combination of a housing attached to said drop front and comprising an upper motor supporting frame, an intermediate shell portion and depending side webs, a motor mounted in said upper supporting frame and having one end of its armature shaft extending beyond one side of said housing, an aperture plate and film confining gate associated with said shell portion of the housing, gear connections at one side of the housing connected to the armature shaft, one of the gears of said connection having ratchet connection with its driving shaft, a pair of intermittent gear wheels having carrying shafts journalled in said side webs with the driving shaft thereof in operative engagement with the aforesaid gear connections, a film feeding drum on the driven shaft of said pair of gear wheels and disposed in the space between the said side webs, a transverse shaft journalled in the lower portion of said webs in adjacent relation to the hinge of the drop front, gearing connections between the transverse shaft and the driving shaft of the intermittent gear wheels, one of the gears of said connection having a carrying shaft formed for manual actuation, film supply and film take-up drums mounted on the ends of said transverse shaft, and a sprocket wheel frictionally mounted on the transverse shaft and adapted for operative connection with the carrying shaft of the film take-up of the reel of the machine.

Signed at Fond du Lac, Wis., this 30th day of October 1922.

CHAS. LEO FITZ.